United States Patent [19]

Uchida et al.

[11] Patent Number: 5,245,498
[45] Date of Patent: * Sep. 14, 1993

[54] DOWNED CONDUCTOR AUTOMATIC DETECTING DEVICE

[75] Inventors: Yamato Uchida; Masami Yokoo; Shiro Sasaki; Mamoru Kishikawa, all of Saga, Japan

[73] Assignee: Togami Electric Mfg. Co., Ltd., Saga, Japan

[*] Notice: The portion of the term of this patent subsequent to Apr. 7, 2009 has been disclaimed.

[21] Appl. No.: 702,857

[22] Filed: May 20, 1991

[30] Foreign Application Priority Data

Dec. 28, 1990 [JP] Japan .................................. 2-409385

[51] Int. Cl.⁵ .......................... H02H 3/13; H02H 3/16
[52] U.S. Cl. ......................................... 361/47; 361/92; 361/93
[58] Field of Search ....................... 361/107, 42, 47, 48, 361/49, 50, 76, 93, 67, 92; 324/509; 340/650, 651

[56] References Cited

U.S. PATENT DOCUMENTS

| | | | |
|---|---|---|---|
| 4,004,201 | 1/1977 | Depuy | 361/93 |
| 4,196,463 | 4/1980 | Dickerson | 361/87 |
| 4,297,738 | 10/1981 | Lee | 361/42 |
| 4,297,740 | 10/1981 | Hagberg | 361/67 |
| 4,313,146 | 1/1982 | Lee | 361/42 |
| 4,429,338 | 1/1984 | Becker et al. | 361/42 |
| 4,600,961 | 7/1986 | Bishop | 361/76 |
| 4,871,971 | 10/1989 | Jeerings et al. | 324/509 |
| 5,103,365 | 4/1992 | Uchida et al. | 361/93 |

Primary Examiner—Todd E. DeBoer
Attorney, Agent, or Firm—Jordan and Hamburg

[57] ABSTRACT

A device for detecting and isolating a downed conductor in a three-phase four-wire multi-grounded distribution system cooperates with a power supply protective device if the device has a breaking capacity less than the maximum prospective short-circuit current of the distribution line, and the device is installed at a lateral of the distribution line. The device comprises a current detecting device, a high-pass filter, a band-pass filter, two arcing ground fault current-detecting circuits, a first overcurrent-detecting circuit that delivers an output when the output current form the current detecting device exceeds a predetermined value, a second overcurrent-detecting circuit that detects an overcurrent exceeding the breaking capacity of the device which has a breaking capacity less than the maximum prospective short-circuit current of the distribution line, a no-voltage detecting circuit for sensing that the distribution line is not electrically charged, and a trip mechanism. This trip mechanism opens the device either when the no-voltage detecting circuit produces an output after the second overcurrent-detecting circuit produces an output or when any one or more of the arcing ground fault current-detecting circuits or the first overcurrent-detecting circuit produces an output while the second overcurrent-detecting circuit produces no output.

12 Claims, 14 Drawing Sheets

DOWNED CONDUCTOR AUTOMATIC DETECTING DEVICE

BACKGROUND OF THE INVENTION

1. Field of the Invention

The present invention relates to a device which is capable of automatically detecting a downed conductor in a three-phase four-wire multi-grounded distribution system and which protects the line from arcing ground faults and overcurrents.

2. Prior Art

Fuses, breakers, sectionalizers, and automatic reclosers are conventional protectors of this kind which operate when the distribution lines occur overcurrents. These protectors can detect overcurrents when the overcurrents exceed the operating currents of the protectors. However, the conventional protectors cannot always protect the downed conductor in the three-phase four-wire multi-grounded distribution system.

The present applicant has already disclosed a new branch device in Japanese Patent Publication No. 38089/1982 in use for a three-phase three-wire ungrounded distribution system. This branch device comprises a no-voltage detecting circuit to lock in the device which has a breaking capacity less than the maximum prospective short-circuit current of the distribution line and to open the device under no-voltage condition of the distribution lines, an overcurrent detecting circuit for detecting an overcurrent which exceeds the breaking capacity of the device, a first activating circuit for activating a trip mechanism, a second activating circuit which is charged by operation of the overcurrent detecting circuit and has a given power circuit to the tripping mechanism, and a relay. When the no-voltage detecting circuit operates, the relay is energized by the second activating circuit and operated for a given time if the overcurrent detecting circuit is operated. When the overcurrent detecting circuit does not operate, the trip mechanism is activated by the operating relay to open the branch device. In this case, operation of the no-voltage detecting circuit is not involved to any operation of the device.

When this branch device locks in, if short-circuit current flows, the device is opened after associated source side protective device opens and under no-voltage condition of the line. If no high short-circuit current flows, i. e., the current is less than the predetermined operating current of the overcurrent detecting circuit, then the branch device opens immediately to isolate the branch circuit. Therefore, the electric power is continuously supplied to all healthy sections without any interference. The power cannot supply only the faulty section. Hence, it can increase the reliability of the power supply. In addition, it is easy to discover a faulty point on the distribution line. Moreover, the branch device is not required to interrupt abnormal high short circuit current and is capable of using an inexpensive device which does not need the high-breaking capacity of the maximum prospective short-circuit current of the distribution line.

An arcing ground fault current which is one of abnormal currents has a unique ground fault phenomenon. In particular, when a distribution line breaks and falls down to the ground, an arc jumps to the ground but does the fault currents are restricted. These faults are described as high impedance faults at the point of the fault. This impedance is often sufficient to restrict current flow values which are low fault levels. From the above example, the ordinary overcurrent protection devices do not protect such high impedance faults. Therefore, some faults will remain undetected and the power supply is resumed. If such an undesirable phenomenon is not remedied, the downed conductors could prove fatal if they come into contact with a human being. Further, fire or other serious accidents may occur.

When the above-described arcing ground fault occurs, it is common practice to disregard the abnormal current, permitting the persistence of supply of the electric power, because the current is less than the operating current of the protective devices. In a three-phase three-wire ungrounded distribution system, the abnormal current can be detected by the method described in the above-cited Japanese Patent Publication No. 38089/1982.

In the U.S.A., the R.O.C., South Korea and other countries, three-phase four-wire multi-grounded distribution systems are applied, since no abnormal voltage is produced when a ground fault occurs, permitting the insulation level of a transformer or other device to be made lower than the insulation level used when a three-phase three-wire ungrounded system is employed. In three-phase three-wire ungrounded systems which are widely adopted in Japan for lines through which voltages less than 30 kV, the magnitude of ground fault currents is a relatively low value but the ground fault currents can be detected and can be distinguished from load currents. The ground fault current can be detected properly only by a core-balanced current transformer which can sense the ground fault current. On the other hand, in the three-phase four-wire multi-grounded distribution system, it is impossible to a core-balanced current transformer to a lateral of the distribution line to sense the ground fault current since there is only one power distribution line and therefore the core-balanced current transformer cannot sense the ground fault current. In order to sense the ground fault current with a core-balanced current transformer, it is necessary to pass both line and load conductors through the core-balanced current transformer to measure an unbalanced current which is the ground fault current.

In a three-phase four-wire multi-grounded distribution system, it is difficult to distinguish ground fault currents from load currents. Depending on the location at which a ground fault occurs, the amplitude of the current may be comparable with a load current or even with a large short-circuit current. Therefore, if the detectable level is lowered to detect a very low current such as an arcing ground fault current of about 10 amperes, then the device is tripped at normal load currents, thus presenting problems. If the detectable level is increased to prevent the device from being tripped at normal load currents, then no arcing ground fault currents can be detected.

SUMMARY OF THE INVENTION

In accordance with the arcing ground fault tests, the ground fault currents are approximately 10 amperes, including a relatively high level of the high-frequency component in the range between 2 kHz and 20 kHz which is created by the arcing, and a relatively low value of the harmonic component of the fundamental current, when the arcing occurs with the dried surfaces such as dirt, sand, gravel, grass, non-reinforced concrete. However, the ground fault currents are approximately 100 amperes, including a relatively low level of the high-frequency component in the range between 2 kHz and 20 kHz, and a relatively high level of the mainly third and fifth harmonic components, 180 Hz and 300 Hz when the fundamental current is 60 Hz, when the arcing occurs with the wet surfaces.

FIG. 14 shows an example of the current versus frequency characteristics when the arcing ground fault occurs. (1) in FIG. 14 is the sensing curve by the arcing ground fault current, setting by the first filter at 1 ampere for the sensing of the high-frequency component and setting by the second filter at 3 amperes for the sensing of the third harmonic component. (2) in FIG. 14 shows the ground fault current in the wet condition, and (3) in FIG. 14 shows the ground fault current in the dry condition.

As stated in the above, the arcing ground fault current contains a relatively large value of the high-frequency component in the range between 2 kHz and 20 kHz and a relatively low value of the third harmonic component, when the contacted surface is the dry condition, and on the contrary, contains a relatively low value of the high-frequency component and a relatively high value of the third harmonic component, when the contacted surface is the wet condition.

In the present invention, the downed conductor automatic detecting device which is installed at a lateral senses not only the high-frequency range but also the third harmonic component of the fundamental current protection under both dry and wet conditions.

Accordingly, more high sensitivity for the downed conductor detecting device can be obtained in wet and dry conditions of the contacted surface.

The present invention of the downed conductor detecting device protects the distribution line from downed conductor accident by judging the high-frequency component and/or the third harmonic component of the fundamental current when it or they exceed(s) the predetermined values.

Other objects and features of the invention will appear in the course of the description thereof which follows.

DETAILED DESCRIPTION OF THE INVENTION

Figure 1:
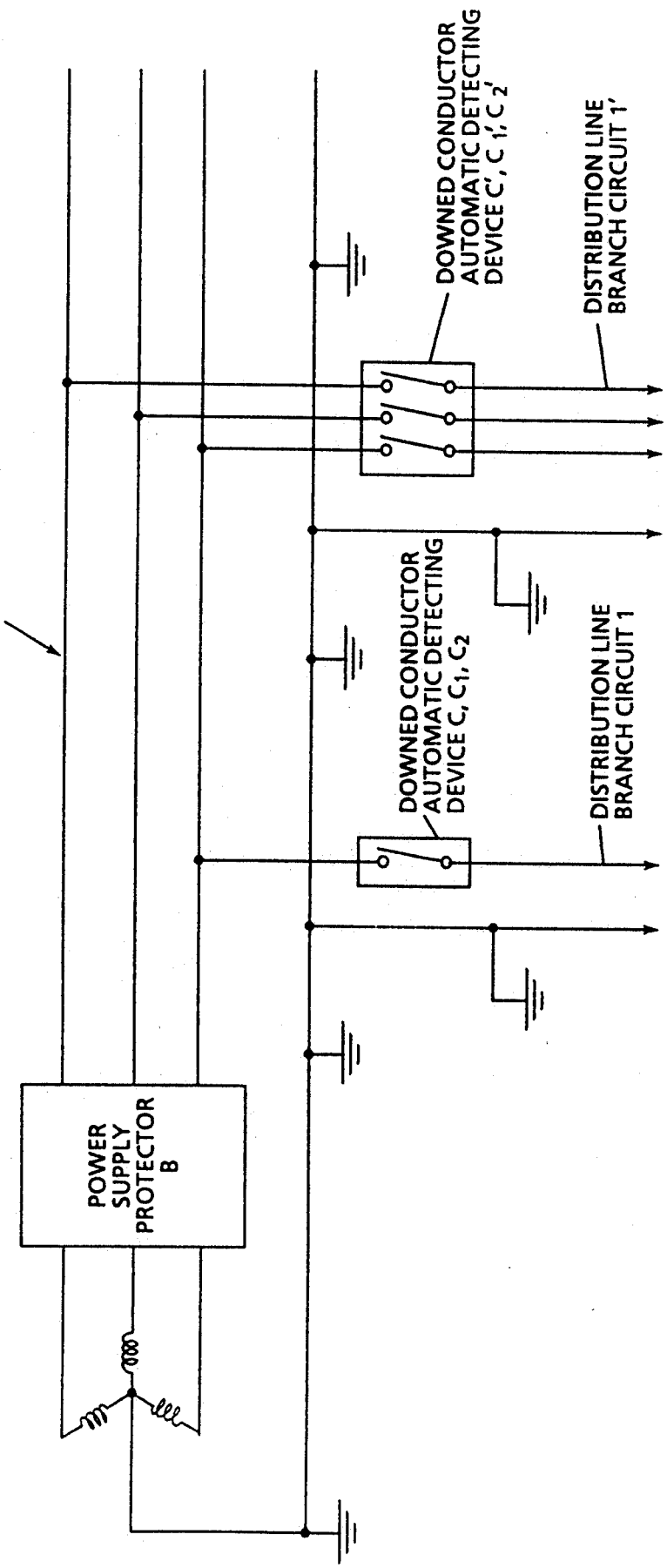
FIG. 1 is a connection diagram of a device for use with a three-phase four-wire multi-grounded distribution system, the device being built in accordance with the invention.

Referring to FIG. 1, there is shown a distribution line of the three-phase four-wire multi grounded distribution system. This distribution line comprises a distribution line main circuit A of the three-phase four-wire multi-grounded distribution system, a power supply protective device B installed in, for example, a substation, a downed conductor automatic detecting device C, C1, C2 installed at a lateral 1 of the distribution line main circuit A for a single-phase distribution system, and an another downed conductor automatic detecting device C', C1', C2' installed at a lateral 1' of the distribution line main circuit A.

Figure 2:
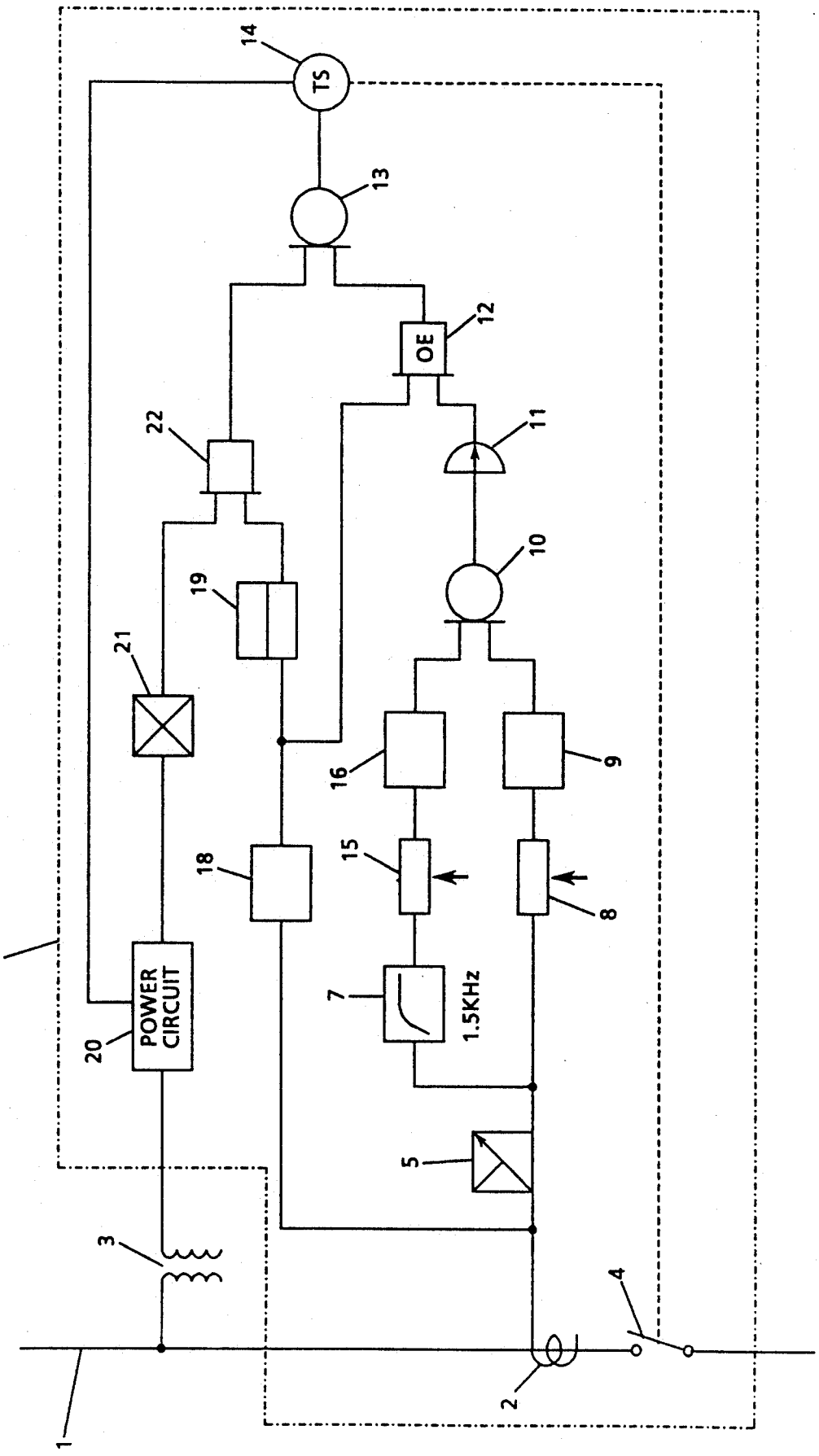
FIG. 2 is a block diagram of a device according to the invention.

The configuration of the downed conductor automatic detecting device C is shown in FIG. 2. This device C comprises a current detecting device 2, such as a current transformer, for detecting an electric current flowing through the distribution line branch circuit 1 of the single-phase distribution system, and an external transformer 3, the transformer acting to give the operating voltage from the branch circuit 1. A device has a main contact 4.

The electric current detected by the current detecting device 2 is enlarged by an amplifier 5 and passed through a high-pass filter 7. The high-pass filter passes frequencies much higher than the power frequency range. The high-pass filter 7 serves to detect arcing ground fault currents. Data obtained by examining arcing ground faults shows that ground fault currents are less than tens of amperes and most of them are less than 10 amperes, and that the frequencies are between 2 kHz and 20 kHz. Therefore, in the present example, the by-pass frequency is set to 1.5 kHz and above frequencies.

The current sensitivity at which a tripping operation is performed is set to 16, 25, 40, 63 or 100 amperes by a sensitivity adjuster 8. If the set current value is surpassed by a load current which is detected by the current detecting device 2, a comparator 9 produces an output signal to an OR circuit 10. A timer 11 is connected to the output of the OR circuit 10 to prevent malfunction if an unwanted inrush current flows through the transformer or the motor or if a flush over which is caused by lightning. The timer 11 delivers an output signal after a lapse of a given time, say between 0.2 and 0.5 second. The output signal from the OR circuit 10 energizes a trip solenoid 14 via the timer 11, an inhibit circuit 12, and an OR circuit 13 to open the main contact 4 of the device.

The output signal from the high-pass filter 7 is compared with the current value, for example 1 ampere, set by a sensitivity adjuster 15, by means of a comparator 16. If the detected arcing ground fault current exceeds that current value, then an output signal is given to the OR circuit 10. After a lapse of a given time, for example between 0.2 and 0.5 second, the trip solenoid 14 is energized via the timer 11, the inhibit circuit 12, and the OR circuit 13 to open the main contact 4 of the device.

The current detected by the current detecting device 2 is also applied to an overcurrent detecting circuit 18. If the detected current exceeds a predetermined range between 800−100 amperes and 800+100 amperes, for example, then the detecting circuit gives an output indicating an abnormal overcurrent. This output signal is store in a memory 19. If such an overcurrent flows through the distribution line 1, then the power supply protective device B interrupts the abnormal current.

Then, when no-voltage is applied across the distribution line 1, the voltage applied to a power circuit 20 connected to the secondary side of the transformer 3 is not available, Then, a no-voltage detecting circuit 21 operates at this time. Since the memory 19 recognizes that an overcurrent flowed, if the AND condition of an AND circuit 22 is met, then the trip solenoid 14 is activated via the OR circuit 13 to open the main contact 4 of the device.

More specifically, the electric power through the high-voltage distribution line 1 is allowed after a lapse of a given period by an automatic recloser (not shown) or the like, and the electric power is supplied in all healthy sections, since the main contact 4 of the device is open and locked out.

The inhibit circuit 12 is provided to give priority to the output signal from the overcurrent-detecting circuit 18 when this circuit is in operation, for performing the above-described processing.

The operating voltage can be taken from the transformer 3. Also, a current transformer or other power supply such as a battery can be used.

Figure 3:
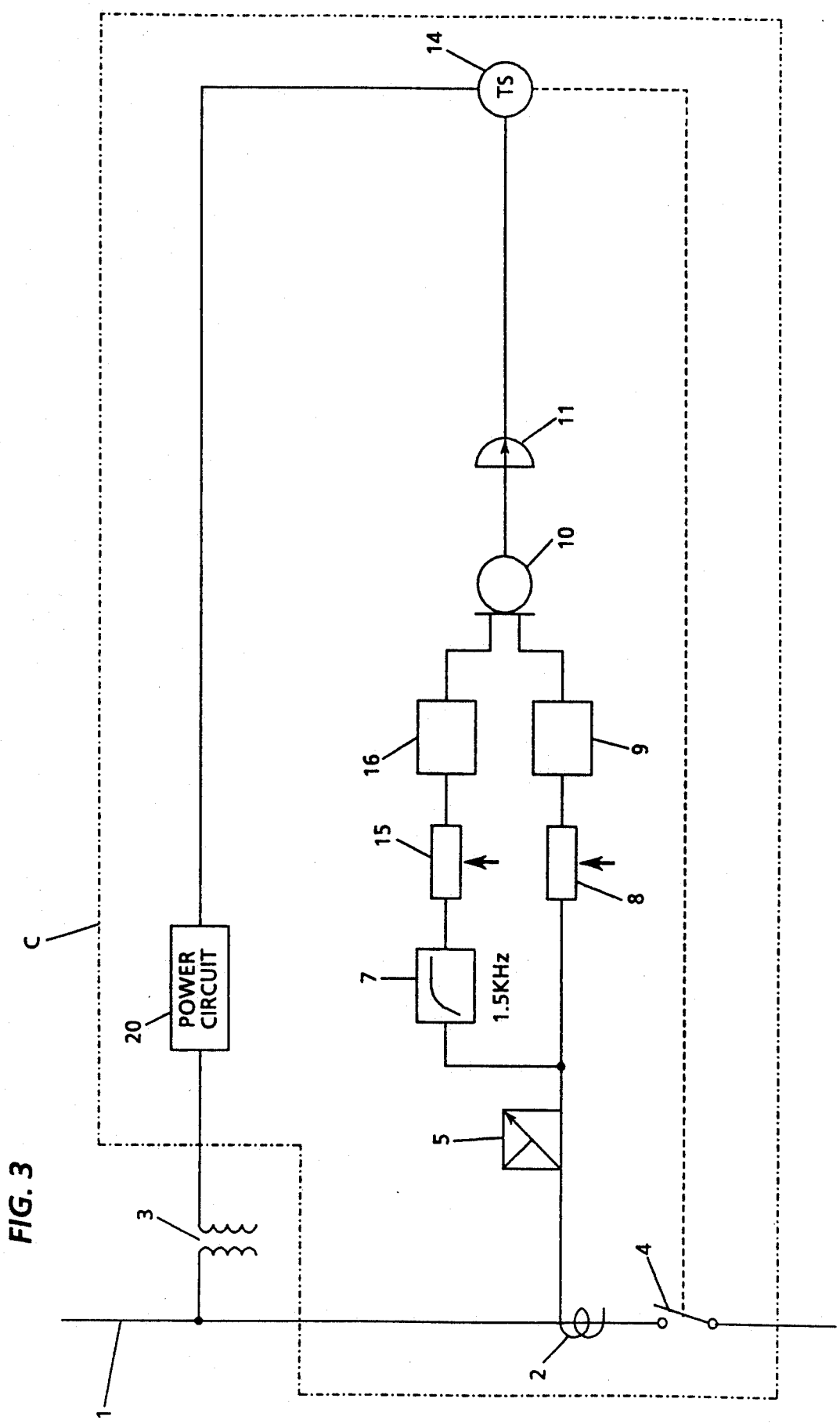
FIGS. 3-13 are block diagrams of other devices according to the invention.

In the case of the structure shown in FIG. 2, the device does not have an interrupting capacity of the high short-circuit current, but has the function to open the device under no-voltage condition. However, if the device has the interrupting capacity of the high short-circuit current, the overcurrent detecting circuit 18, the no-voltage detecting circuit 21 and their related circuits can omit as shown in FIG. 3, the second example structure.

Figure 4:
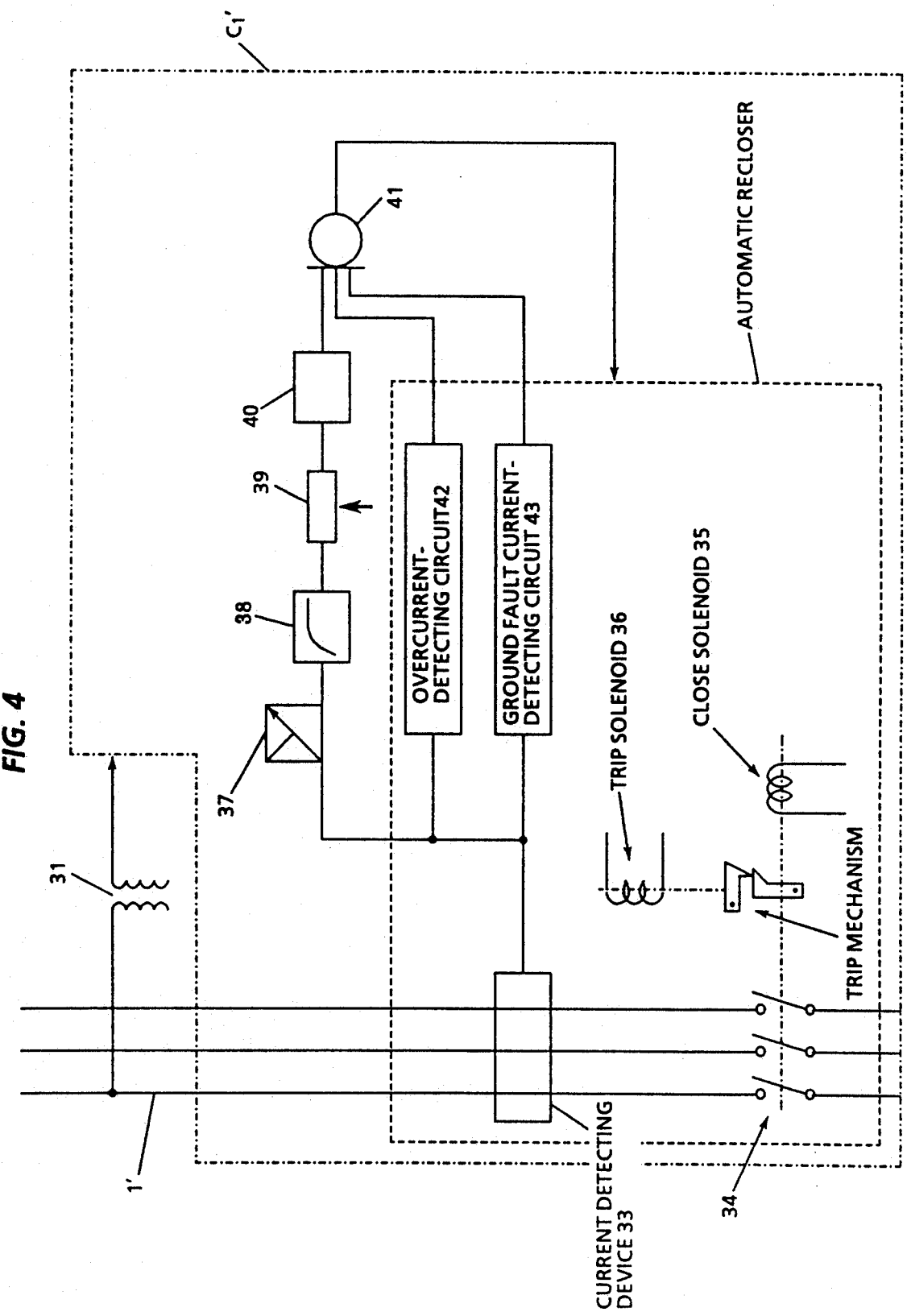

FIG. 4 is a block diagram showing the third example structure of a downed conductor automatic detecting device C1' which is equipped with an automatic recloser and installed in a lateral of a three-phase four-wire multi-grounded distribution line branch circuit 1'. In this example, the operating voltage is taken by connecting an external transformer 31 with the branch circuit 1'. A current detecting device 33 is connected with the branch circuit 1'. A device has a main contact 34 which is closed by a closing solenoid 35 and opened by a trip solenoid 36.

The electric current detected by the current detecting device 33 is enlarged by an amplifier 37 and passed through a high-pass filter 38 which passes a high frequency component. The filter 38 acts to detect arcing ground fault currents, and its by-pass frequency is set to 1.5 kHz and above frequencies The output signal from the filter 38 is compared with the current, for example 1 ampere, set by a sensitivity adjuster 39, by means of a comparator 40. If the detected arcing ground fault current exceeds the set value, an output signal is given to an OR circuit 41 to energize the trip solenoid 36, for opening the main contact 34 of the device.

Those currents which are detected by the current detecting device 33 are detected by an overcurrent-detecting circuit 42. If ah overcurrent exceeding a predetermined current value is detected, an output signal is given to the OR circuit 41 to energize the trip solenoid 36, thus opening the main contact 34 of the device.

The current detected by the current detecting device 33 is applied to a ground fault current-detecting circuit 43. If a ground fault current exceeding a predetermined level is detected, an output signal is given to the OR circuit 41 to thereby energize the trip solenoid 36. As a result, the main contact 34 of the device is opened.

Figure 5:
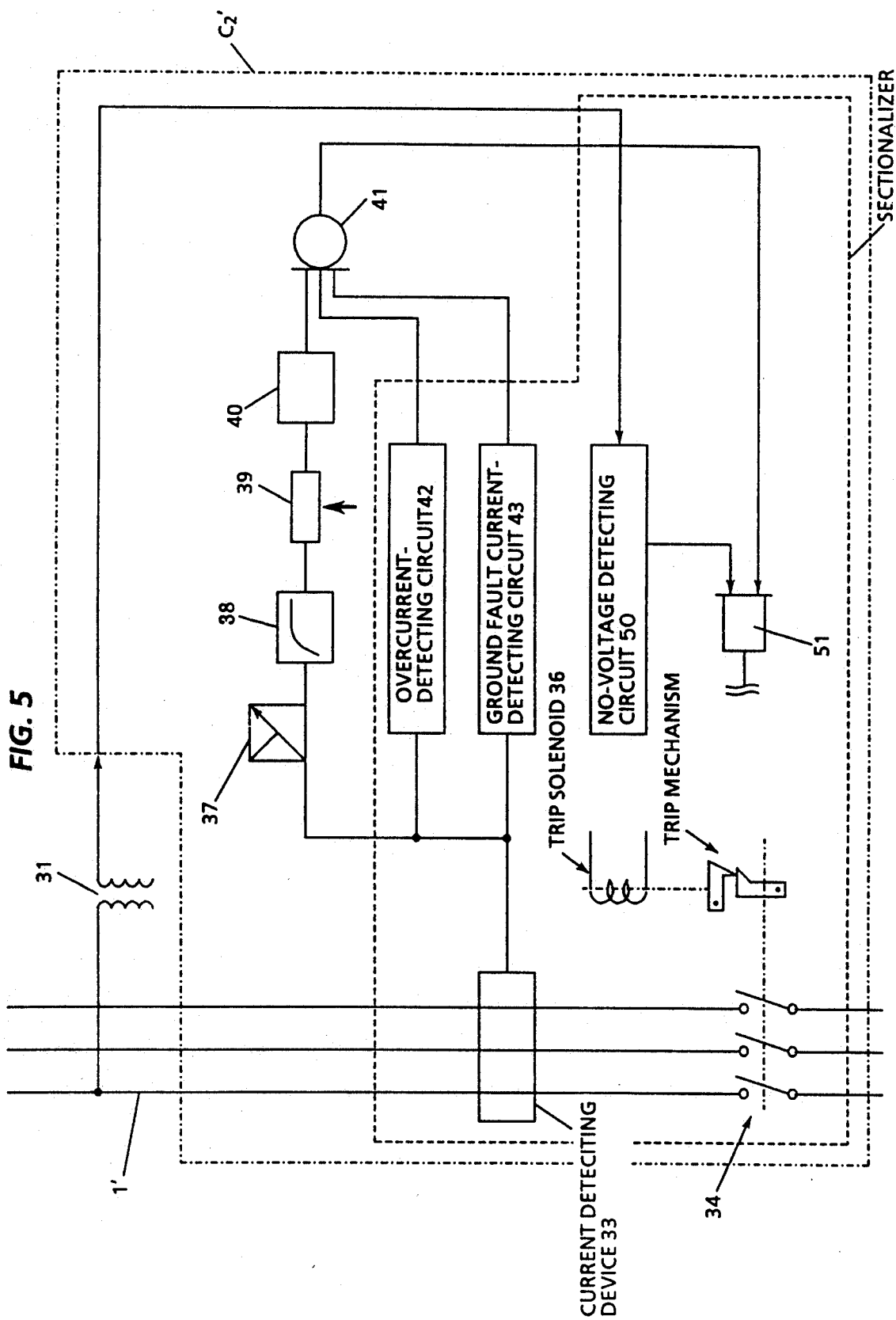

FIG. 5 is a block diagram of the fourth example of a downed conductor automatic detecting device C2' which is installed in a lateral of a three-phase four-wire multi-grounded distribution line branch circuit 1' and equipped with a sectionalizer. In this example, the line voltage applied across the distribution line branch circuit 1' is detected in the secondary side of an external transformer 31. A no-voltage detecting circuit 50 detects the presence or absence of voltage. The output from the no-voltage detecting circuit 50 and the output from the OR circuit 41 (described in FIG. 4) are applied to an AND circuit 51. When both output signals are present, the trip solenoid 36 is energized to open the main contact 34 of the device. That is, the trip mechanism is activated only when the line voltage across the branch circuit 1' is not available even if an arcing ground fault current, an overcurrent, or a ground fault current is detected.

The above examples show a ground fault current detection by means of the high-frequency component sensing method.

The next example shows a ground fault current detection by means of not only the high-frequency component sensing method, but also the harmonic component of the fundamental current sensing method.

Figure 6:
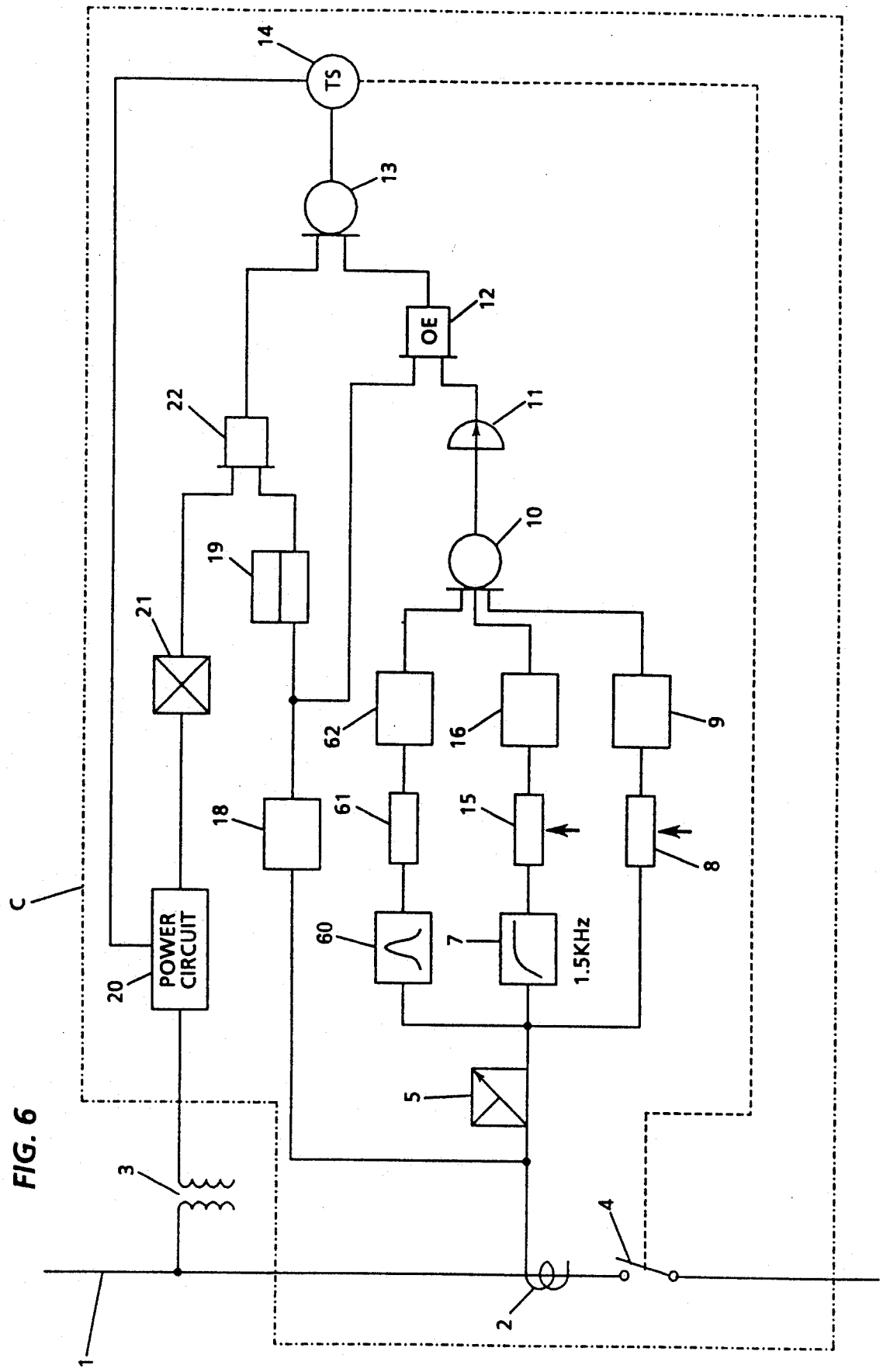

FIG. 6 shows the fifth example of this invention. In this example, a second filter 60, a sensitivity adjuster 61 and a comparator 62 are added to the configurations of the first example described in FIG. 2, and connected to the input terminal of the OR circuit 10.

Figure 14:
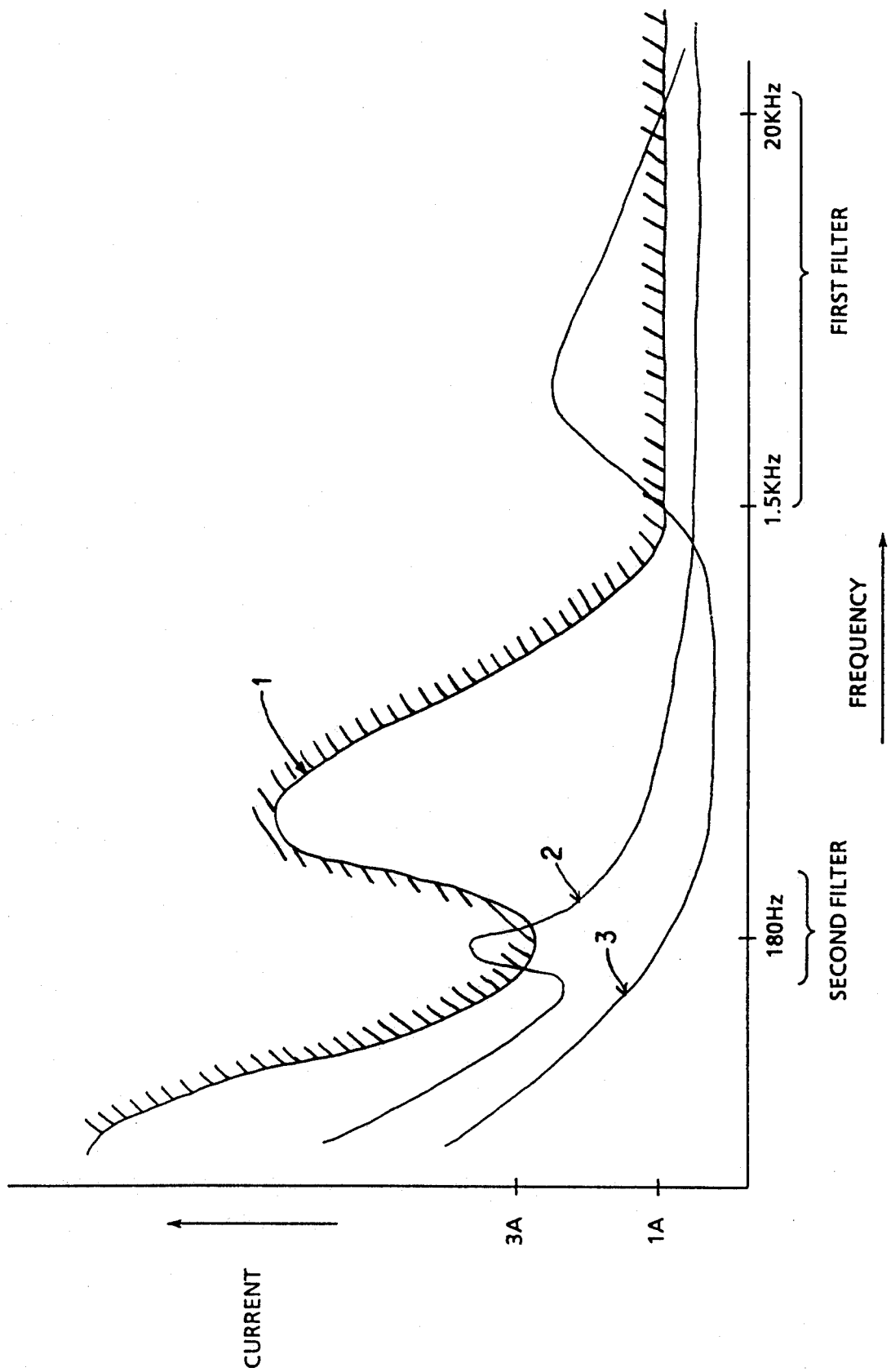

In accordance with the arcing ground fault tests, the fault currents include a relatively high level of the third harmonic component of the fundamental current when the arcing occurs with the wet surfaces. Therefore, passing the center frequency of the band-pass filter 60 is set at 180 Hz (Refer to FIG. 14).

The IEEE standard 519 says that the maximum voltage distortion, for 2.3–69 kV, individual harmonics is 3.0 percent. Therefore, the current sensitivity at which a tripping operation is performed is set to, for examples, 1, 2, 3, 5 amperes by the sensitivity adjuster 61. In this example, the current sensitivity of the sensitivity. adjuster 61 for the third harmonic component is set to more than 3 percent of the current sensitivity adjuster 8 so that it does not cause a false tripping by the floor level of the harmonic components. When the load current including the harmonic components which are detected by the current detecting device 2 exceeds this set current value, then an output signal from the comparator 62 is given to the OR circuit 10. The OR circuit 10 gives an output signal to the timer 11 when it receives an input of a detected current of the high-frequency component by the high-pass filter 7 or a load current, in addition to this ground fault detecting current. In following respects, this example is similar in operation to the example shown in FIG. 2 and these similar points will not be described.

Figure 7:
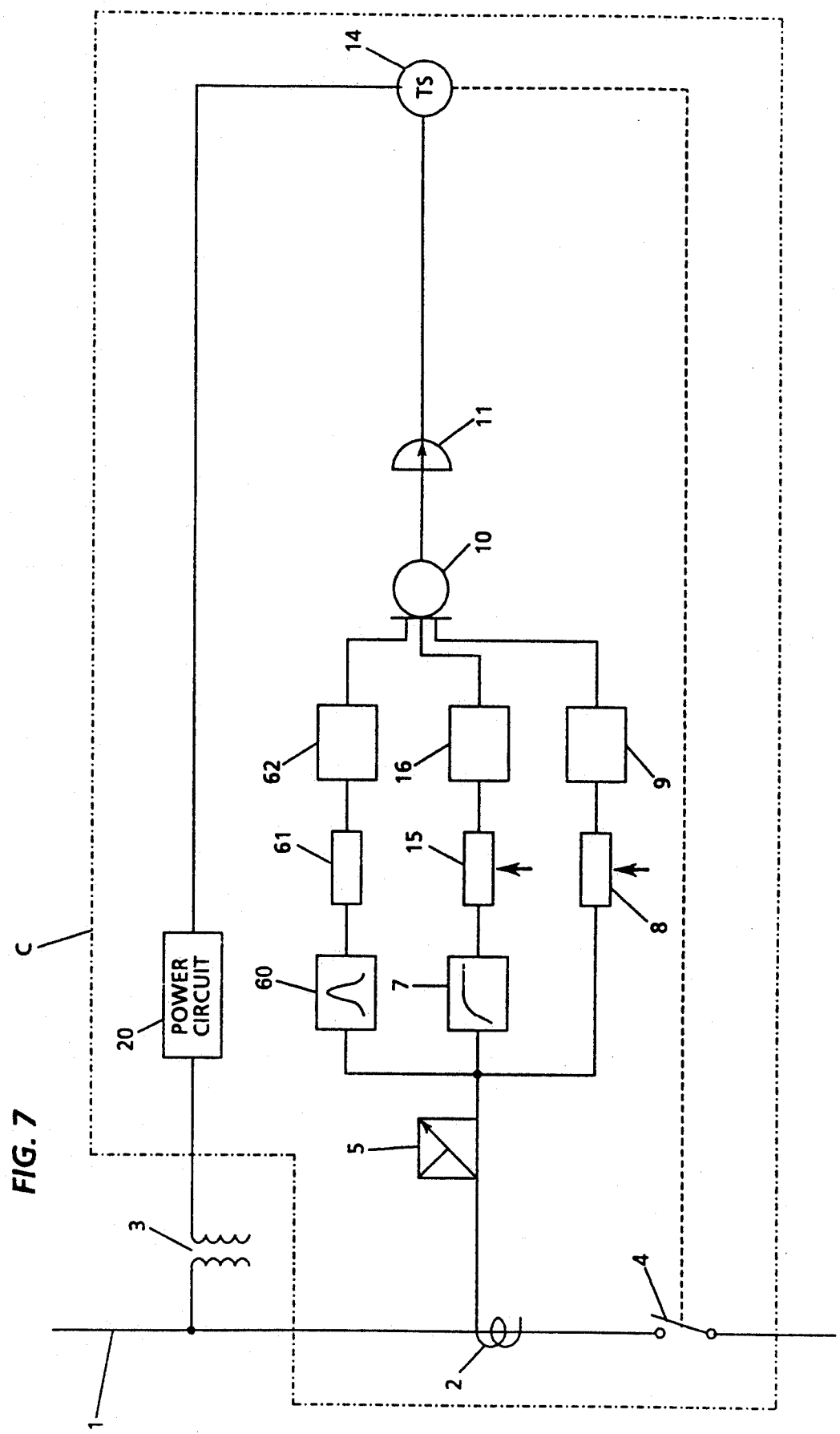

The above example in FIG. 6, the fifth example structure, shows the case that the device is opened under no-voltage condition since the device does not have the interrupting capacity of the high short-circuit current. On the other hand, if the device has the interrupting capacity of the high short-circuit current, the overcurrent detecting circuit 18, the no-voltage detecting circuit 21 and their related circuits can omit as shown in FIG. 7, the sixth example.

Figure 8:
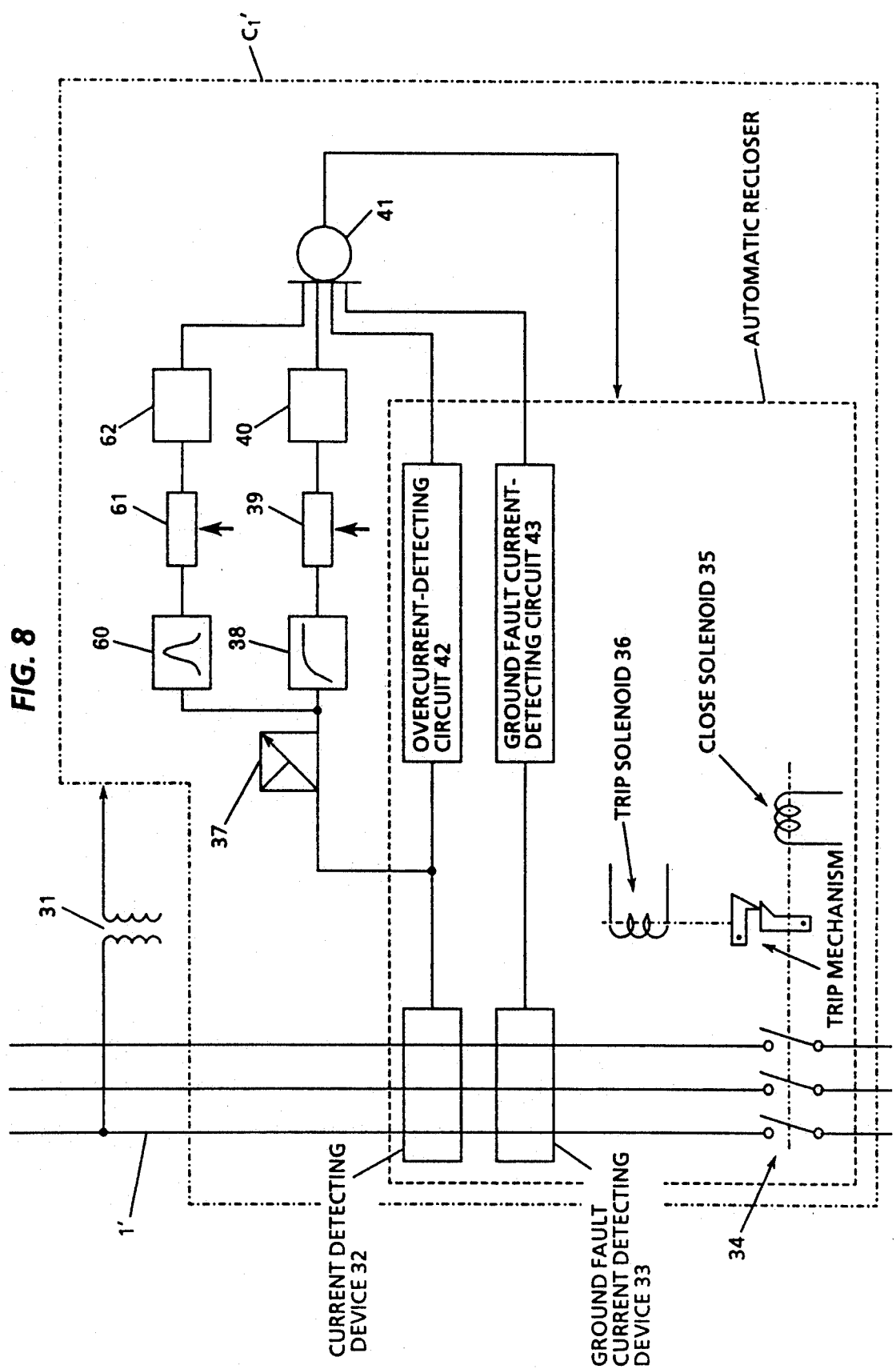

FIG. 8 is a block diagram showing the seventh example structure of a downed conductor automatic detecting device C1' which is equipped with an automatic recloser and installed in a lateral of a three-phase four-wire multi-grounded distribution line branch circuit 1'. In this example; the operating the device can get by the connection of an external transformer 31 with the branch circuit 1'. A current detecting device 32 and a ground fault current detecting device 33 are connected with the branch circuit 1'. A device has a main contact 34 which is closed by a closing solenoid 35 and opened by a trip solenoid 36.

The electric currents which are detected by the current detecting device 32 are enlarged by an amplifier 37 and passes through a high-pass filter 38 which passes high frequency component. The filter 38 acts to detect arcing ground fault currents. The output signal from the high-pass filter 38 is compared with the current value, for an example 1 ampere, set by a sensitivity adjuster 39, by means of a comparator 40. If the detected arcing ground fault current exceeds that current value, then an output signal is given to an OR circuit 41 to energize the trip solenoid 36, for opening the main contact 34 of the device. A band-pass filter 60 acts to pass the harmonic components of the fundamental current, especially the third harmonic component. A sensitivity adjuster 61 is set to, for example 3 amperes, current level by means of a comparator 62. If input level from the sensitivity adjuster 61 exceeds that set level, then output signal is given to the OR circuit 41.

Those currents which are detected by the current detecting device 32 and have frequencies lying in the power frequency range are detected by an overcurrent detecting circuit 42. If an overcurrent exceeding a predetermined current is detected, an output signal is given to the OR circuit 41 to energize the trip solenoid 36, thus opening the main contact 34 of the device.

The ground fault current detected by the ground fault current detecting device 33 is applied to a ground fault current detecting circuit 43. If a ground fault current exceeding a predetermined level is detected, an output signal is given to the OR circuit 41 to hereby energize the trip solenoid 36. As a result, the main contact 34 of the device is opened.

Figure 9:
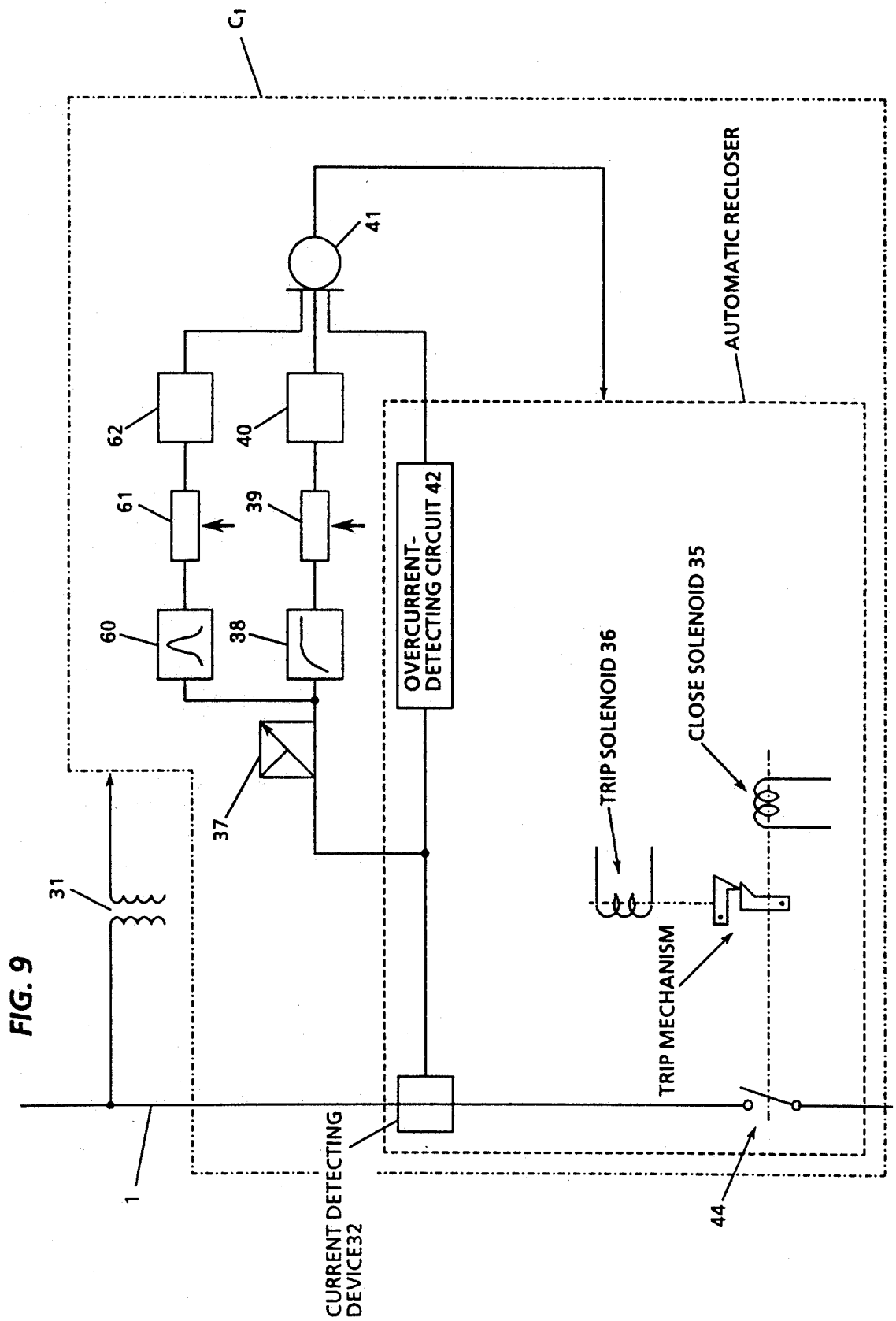

Referring next to FIG. 9, there is shown the eighth example of a downed conductor automatic detecting device C1 which is installed in a single-phase distribution line branch circuit 1 and equipped with an automatic recloser. In this example, the ground fault current detecting device 33 and the ground fault current detecting circuit 43 are omitted. When an overcurrent or an arcing ground fault current is detected, the main contact 44 of the device is opened. In other respects, this example is similar in configuration and operation to the example shown in FIG. 8 and so these similar points will not be described.

Figure 10:
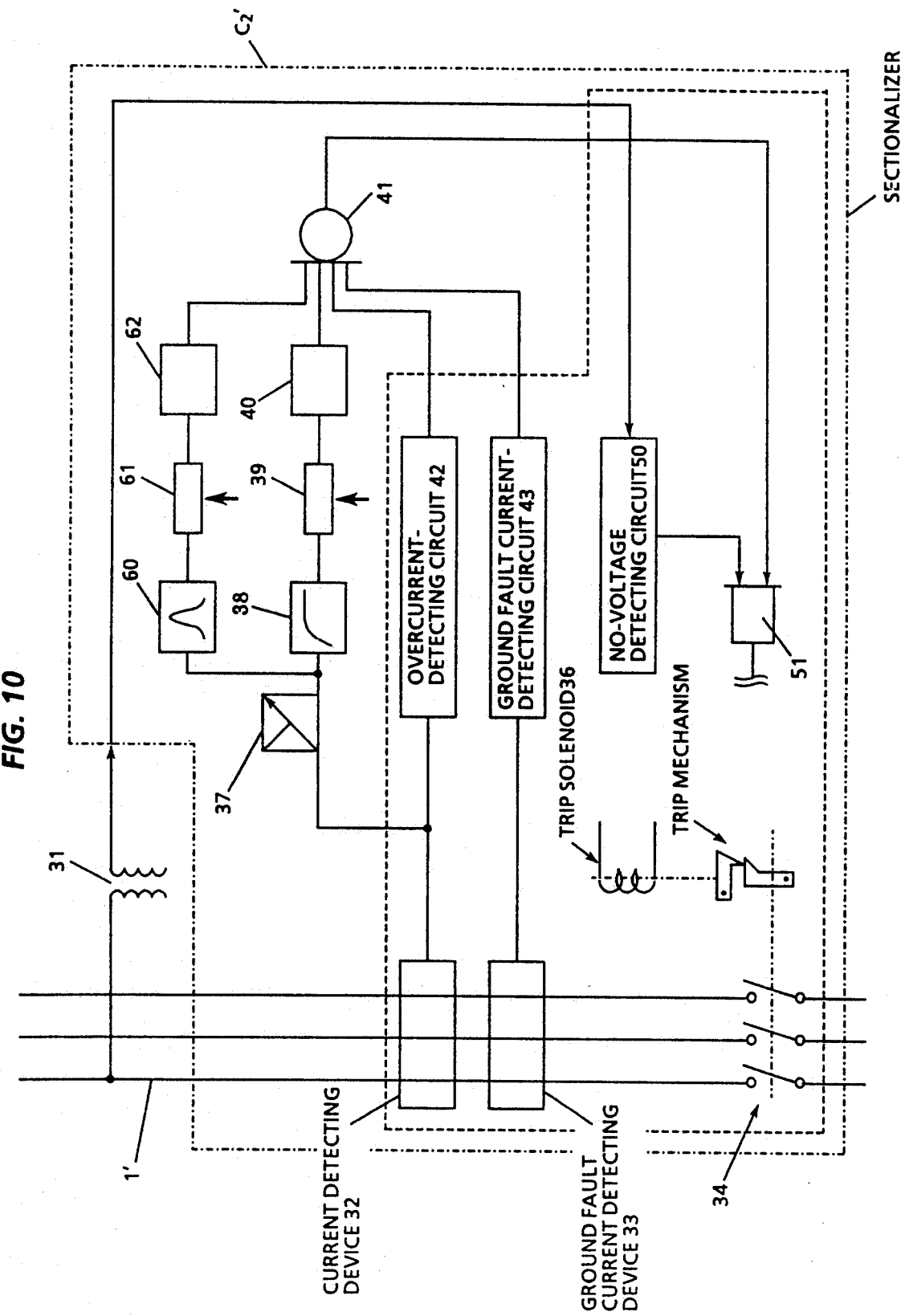

FIG. 10 is a block diagram showing the ninth example structure of a downed conductor automatic detecting device C2' which is installed in a three-phase four-wire multi-grounded distribution line branch circuit 1' and equipped with a sectionalizer. In the present example, the line voltage applied across the distribution line branch circuit 1' is detected in the secondary side of an external transformer 31. A no-voltage detecting circuit 50 detects the presence or absence of a voltage. The output from the OR circuit 41 (described in FIG. 8) is given to an AND circuit 51. When both output signals are present, a trip solenoid 36 is energized to open the main contact 34 of the device. That is, the trip mechanism is activated only when the voltage across the branch circuit 1' is not available even if an arcing ground fault current, an overcurrent, or a ground fault current is detected.

Figure 11:
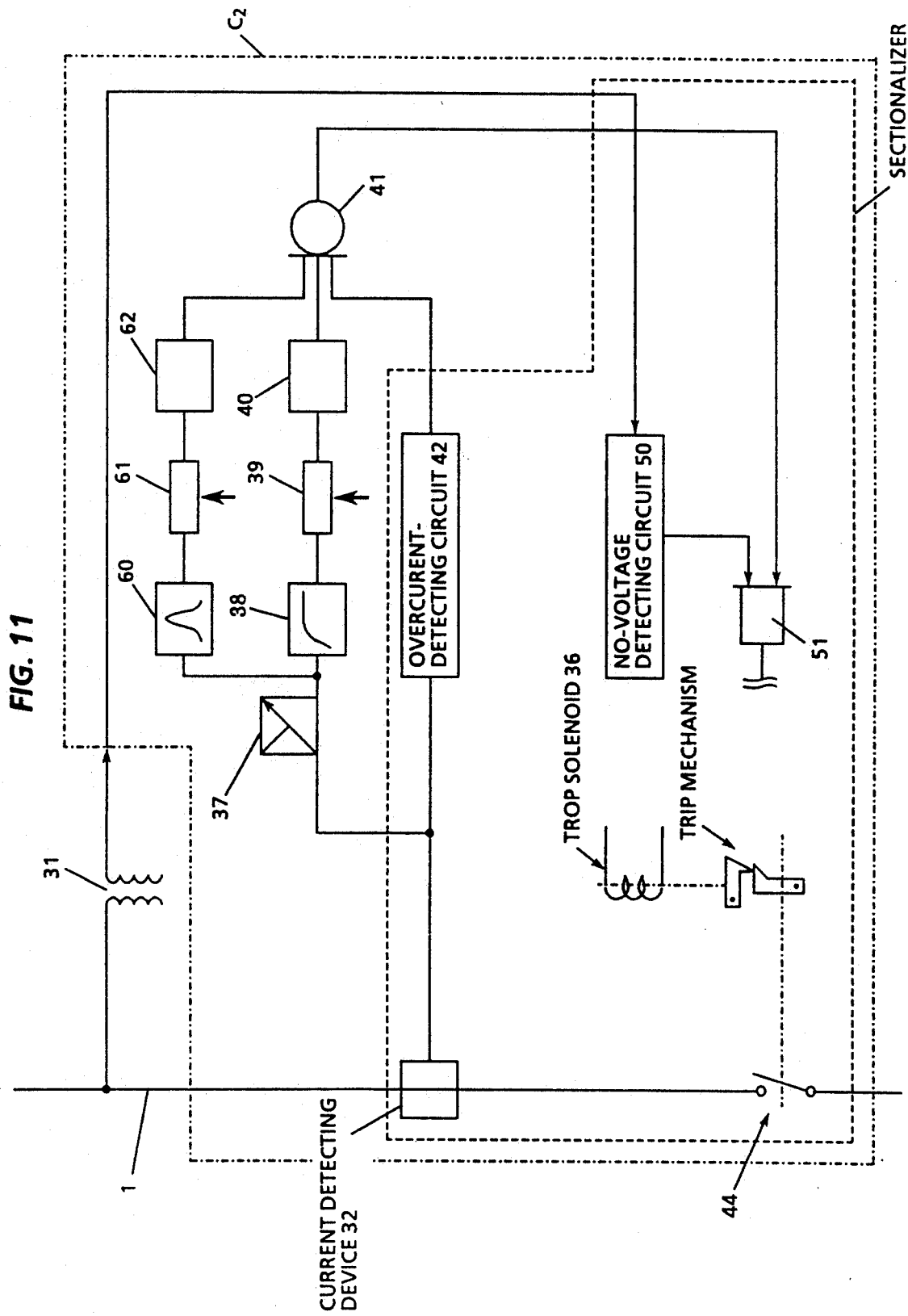

FIG. 11 is a block diagram showing the tenth example structure of a downed conductor automatic detecting device C2 which is installed in a single-phase distribution line branch circuit 1 and equipped with a sectionalizer. This example is similar in structure and operation to the example shown in FIG. 10 except for the following points. The ground fault current detecting device 33 and the ground fault current detecting circuit 43 are omitted. If an overcurrent or an arcing ground current is detected, and if the absence of voltage is detected, the main contact 44 of the device is opened. In other respects, this example is similar in configuration and operation to the example shown in FIG. 10 and so these similar points will not be described.

Figure 12:
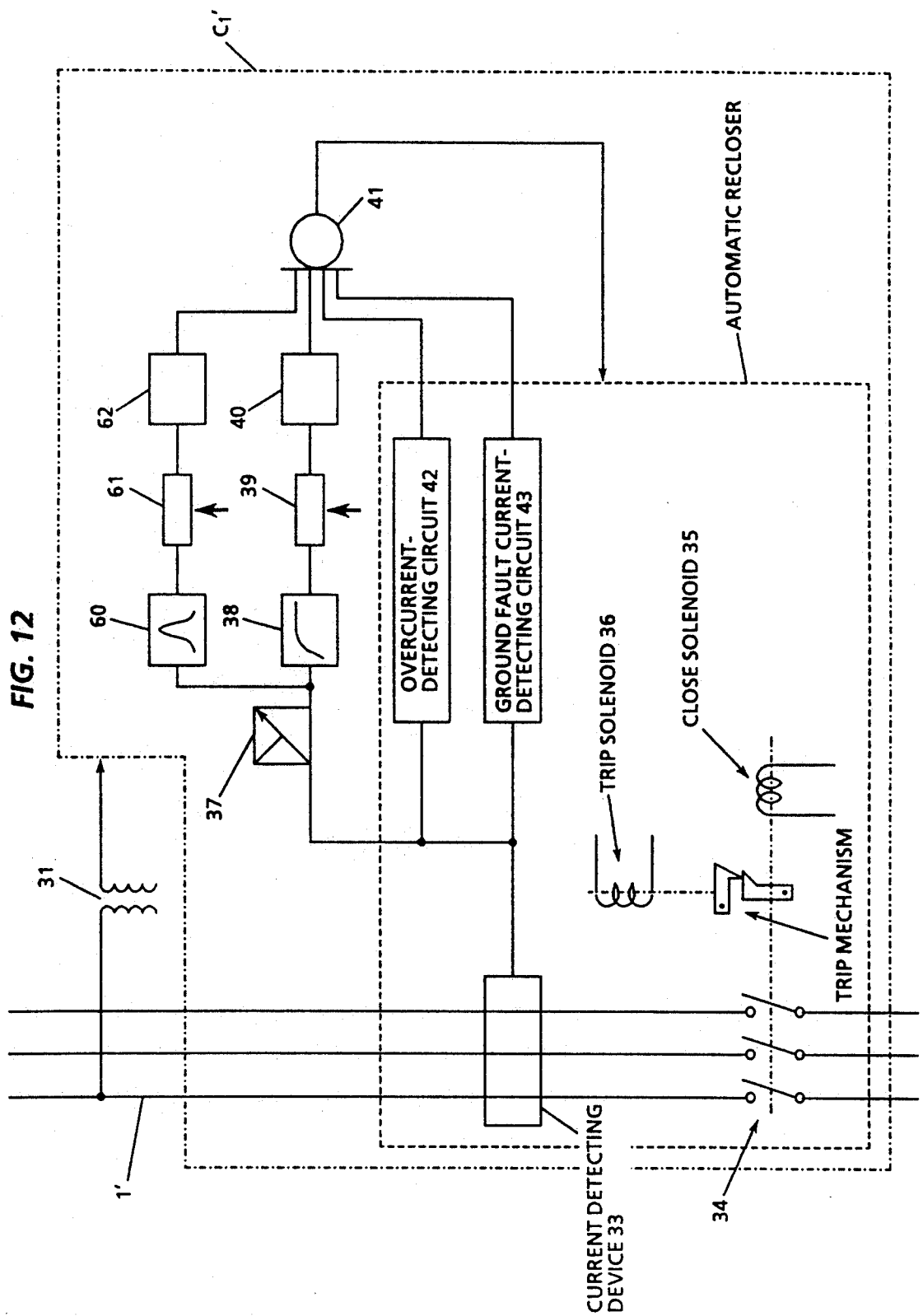

FIG. 12 shows the eleventh example of this invention. In this example, a band-pass filter 60, a sensitivity adjuster 61 and a comparator 62 are added to the configurations of the example in FIG. 4, and connected to an input terminal of the OR circuit 41. By this means, arcing ground faults can be detected also by a level of the harmonic component of the fundamental current. In other respects, this example is similar in operation to the example shown in FIG. 4 and so these similar points will not be described.

Figure 13:
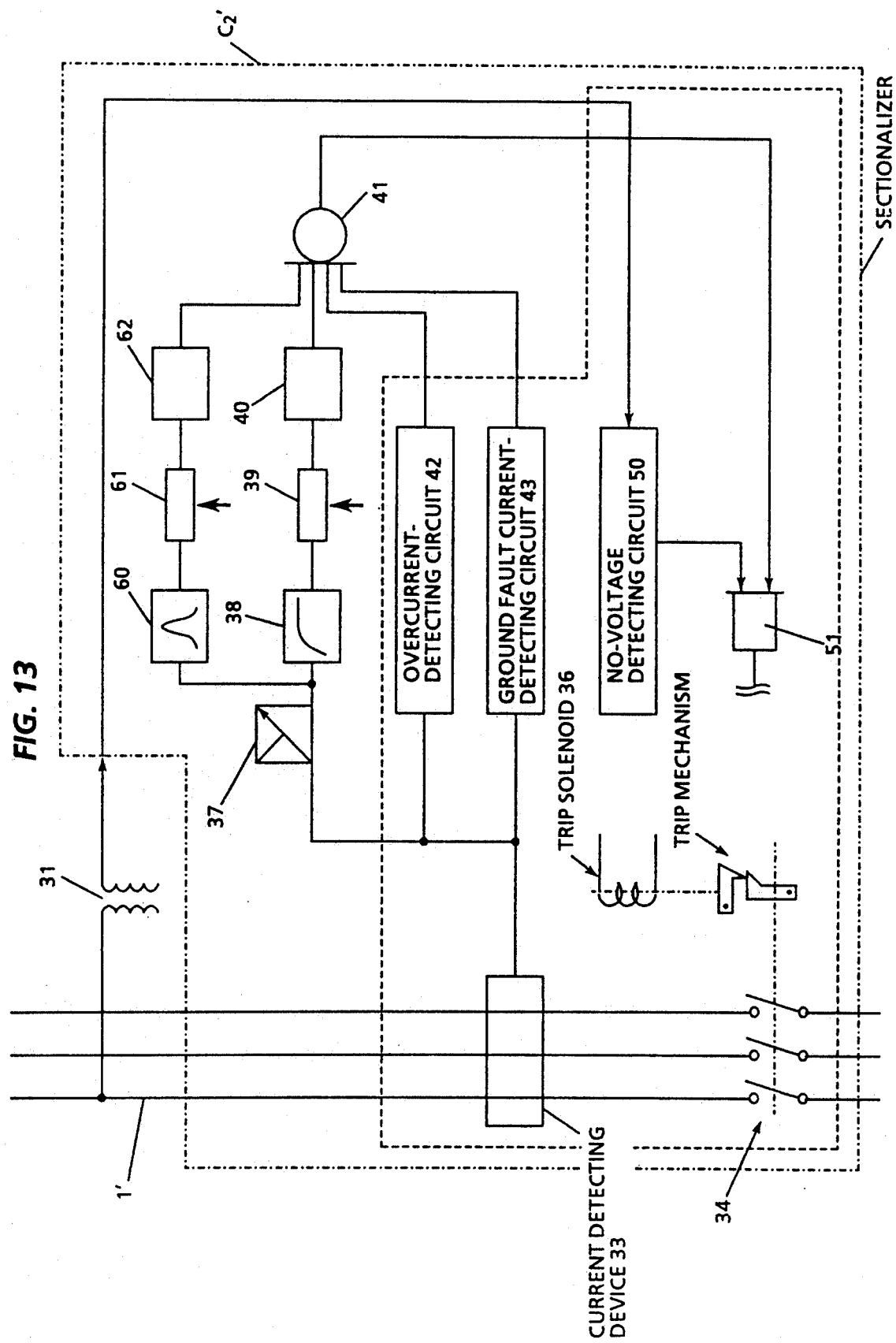

FIG. 13 shows the twelfth example of this invention. In this example, a band-pass filter 60, a sensitivity adjuster 61 and a comparator 62 are added to the configurations of the example in FIG. 5, and connected to an input terminal of the OR circuit 41. By this means, arcing ground faults can be detected also by a level of the harmonic component of the fundamental current. In other respects, this example is similar in operation to the example shown in FIG. 5 and so these similar points will not be described.

The functions of the sectionalizer and the automatic recloser are now described.

The sectionalizer is used as a device which automatically isolates a distribution line equipped with the automatic recloser. The sectionalizer cooperates with the automatic recloser to isolate a permanent fault and to restrict the faulty section.

The sectionalizer is installed on the load side of a back-up protector (automatic recloser) and detects and records an abnormal current flowing through the sectionalizer. The sectionalizer can be set up so that it is opened after the first, second or third trip action is performed. The automatic recloser can make one, two, three or four counts. The number of counts can be set at will. After the final trip that has been set, the reclosing mechanism of the automatic recloser is locked out. The sectionalizer isolates the faulty section after the automatic recloser interrupts the abnormal current. That is, the sectionalizer does not interrupt an abnormal current.

If a permanent fault occurs, the sectionalizer records the numbers of flowing overcurrents made by the automatic recloser according to the fault, as well as the number (1, 2 or 3) of repeated operations set into the sectionalizer. Then, the sectionalizer opens to isolate the faulty section. The sectionalizer cannot be closed unless operated manually.

Where a temporary fault occurs, if the situation is remedied before the number of repeated operations set into the sectionalizer is reached, then the number of flowing overcurrents recorded in the sectionalizer cancels after a lapse of a given time, i. e., after the total count is reset.

The sectionalizer must sense every interruption performed by the back-up automatic recloser in response to a fault. Thus, the sectionalizer senses phase faults and ground faults. As an example, 8 taps are assigned to a phase fault current, while 10 taps are assigned to a ground fault current.

Selection of a detected abnormal current and setting of the number of repeated operations for opening the sectionalizer are performed by a control box or the like.

As described thus far, in accordance with the invention, detection of an arcing ground fault and a downed conductor occurring in a three-phase four-wire multi-grounded distribution system can be performed, as well as detection of an overcurrent, and an isolating operation of the device. The electric power can be restarted while restricting the faulty section. Additionally, accidents to human being and fires can be prevented. The novel device can be installed without modifying the conventional distribution system. Hence, greater economy of cost can be attained.

What is claimed is:

1. A device for automatically detecting a downed conductor, said device cooperating with a power supply protective device comprising:
   a current detecting means for detecting the electric current flowing through a single-phase branch circuit in a three-phase four-wire multi-grounded distribution line;
   a first filter that passes the high-frequency component of the output current from the current detecting means;
   an arcing ground fault current-detecting means which produces a signal indicating an arcing ground fault when the output current from the first filter exceeds a predetermined value;
   a first overcurrent-detecting means which produces a signal indicating an overcurrent when the output current form the current detecting means exceeds a predetermined value;
   a second overcurrent-detecting means which detects an overcurrent exceeding the breaking capacity of a device which has a breaking capacity less than the maximum prospective short-circuit current of the distribution line;
   a no-voltage detecting means which senses that the distribution line is not electrically charged; and
   a trip mechanism for opening the device either when the no-voltage detecting means produces an output signal after the second overcurrent-detecting means produces an output signal or when the arcing ground fault current-detecting means and/or the first overcurrent-detecting means produces an output signal while the second overcurrent-detecting means produces no output signal.

2. A device for automatically detecting a downed conductor, said device comprising:
   a current detecting means for detecting the electric current flowing through a single-phase branch circuit in a three-phase four-wire multi-grounded distribution line;
   a first filter that passes the high-frequency component of the output current from the current detecting means;
   an arcing ground fault current-detecting means which produces a single indicating an arcing ground fault when the output current from the first filter exceeds a predetermined value;
   a first overcurrent-detecting means which produces a signal indicating an overcurrent when the output current from the current detecting means exceeds a predetermined value;
   a trip mechanism for opening the device when the arcing ground fault current-detecting means and/or the first overcurrent-detecting means produces an output signal.

3. A device for automatically detecting a downed conductor, said device being equipped with an automatic recloser, said device comprising:
   a current detecting means for detecting the electric current flowing through a three-phase four-wire multi-grounded distribution line;
   a first filter that passes the high-frequency component of the output current from the current detecting means;
   an arcing ground fault current-detecting means which produces a signal indicating an arcing ground fault when the output signal from the first filter exceeds a predetermined value;
   an overcurrent-detecting means which produces a signal indicating an overcurrent when the output current form the current detecting means exceeds a predetermined current value;
   a ground fault current detecting means which produces a signal indicating a ground fault when the ground fault current detected by the current detecting means exceeds a predetermined current value; and
   a trip mechanism which opens the device when one or more of the detecting means produces an output signal.

4. A device for automatically detecting a downed conductor, said device being equipped with a sectionalizer, aid device comprising:
   a current detecting means for detecting the electric current flowing through a three-phase four-wire multi-grounded distribution line;
   a first filter that passes the high-frequency component of the output current from the current detecting means;
   an arcing ground fault current-detecting means which produces a signal indicating an arcing ground fault when the output signal from the first filter exceeds a predetermined value;
   an overcurrent-detecting means which produces a signal indicating an overcurrent when the output current from the current detecting means exceeds a predetermined value;
   a ground fault current-detecting means which produces a signal indicating a ground fault when the ground fault current detected by the current detecting means exceeds a predetermined value;
   a no-voltage detecting means which senses that the distribution line is not electrically charged; and
   a trip mechanism which opens the device when the no-voltage detecting means produces an output after one or more of the arcing ground fault current-detecting means, the overcurrent-detecting means and the ground fault current-detecting means produces an output.

5. A device for automatically detecting a downed conductor, said device cooperating with a power supply protective device comprising:
   a current detecting means for detecting the electric current flowing through a single-phase branch circuit in a three-phase four-wire multi-grounded distribution line;
   a first filter that passes the high-frequency component of the output current from the current detecting means;
   an arcing ground fault current-detecting means which produces a signal indicating an arcing ground fault when the output current from the first filter exceeds a predetermined value;
   a first overcurrent-detecting means which produces a signal indicating an overcurrent when the output current from the current detecting means exceeds a predetermined value;
   a second overcurrent-detecting means which detects an overcurrent exceeding the breaking capacity of a device which has a breaking capacity less than the maximum prospective short-circuit current of the distribution line;

a second filter that passes those frequencies of the output currents from the current detecting means which are the harmonic components of the power frequency;

an arcing ground fault current-detecting means which produces a signal indicating an arcing ground fault when the output current from the second filter exceeds a predetermined value;

a no-voltage detecting means which senses that the distribution line is not electrically charged; and a trip mechanism for opening the device either when the no-voltage detecting means produces an output signal after the second overcurrent-detecting means produces an output signal or when one or more of the arcing ground fault current-detecting means and the first overcurrent-detecting means produces an output signal while the second overcurrent-detecting means produces no output signal.

6. A device for automatically detecting a downed conductor, said device comprising:

a current detecting means for detecting the electric current flowing through a single-phase branch circuit in a three-phase four-wire multi-grounded distribution line;

a first filter that passes the high-frequency component of the output current from the current detecting means;

an arcing ground fault current-detecting means which produces a signal indicating an arcing ground fault when the output current from the first filter exceeds a predetermined value;

a first overcurrent-detecting means which produces a signal indicating an overcurrent when the output current from the current detecting means exceeds a predetermined value;

a second filter that passes those frequencies of the output currents from the current detecting means which are the harmonic components of the power frequency;

an arcing ground fault current-detecting means which produces a signal indicating an arcing ground fault when the output current from the second filter exceeds a predetermined value;

a trip mechanism for opening the device when one or more of the arcing ground fault current-detecting means and the first overcurrent-detecting means produces an output signal.

7. A device for automatically detecting a downed conductor, said device being equipped with an automatic recloser, said device comprising:

a current detecting means for detecting the electric current flowing through a three-phase four-wire multi-grounded distribution line;

a first filter that passes the high-frequency component of the output current from the current detecting means;

an arcing ground fault current-detecting means which produces a signal indicating an arcing ground fault when the output current from the first filter exceeds a predetermined value;

a second filter that passes those frequencies of the output currents from the current detecting means which are the harmonic components of the power frequency;

an arcing ground fault current-detecting means which produces a signal indicating an arcing ground fault when the output current from the second filter exceeds a predetermined value;

an overcurrent-detecting means which produces a signal indicating an overcurrent when the output current from the current detecting means exceeds a predetermined current value;

a ground fault current detecting means for detecting ground fault current which flows through the distribution line and has the power frequency;

a ground fault current-detecting circuit means which produces a signal indicating a ground fault when the ground fault current detected by the ground fault current detecting means exceeds a predetermined current value; and a trip mechanism which opens the device when one or more of the detecting means produces an output signal.

8. A device for automatically detecting a downed conductor, said device being equipped with an automatic recloser, said device comprising:

a current detecting means for detecting the electric current flowing through the single-phase branch circuit in a three-phase four-wire multi-grounded distribution system;

a first filter that passes the high-frequency component of the output current from the current detecting means an arcing ground fault current-detecting means which produces a signal indicating an arcing ground fault when the output current from the first filter exceeds a predetermined value;

a second filter that passes those frequencies of the output currents from the current detecting means which are the harmonic components of the power frequency;

an arcing ground fault current-detecting means which produces a signal indicating an arcing ground fault when the output current from the second filter exceeds a predetermined current value;

an overcurrent-detecting means which produces a signal indicating an overcurrent when the output current from the current detecting means exceeds a predetermined current value; and a trip mechanism which opens the device when one or more of the detecting means produces an output signal.

9. A device for automatically detecting a downed conductor, said device being equipped with a sectionalizer, said device comprising:

a current detecting means for detecting the electric current flowing through a three-phase four-wire multi-grounded distribution line;

a first filter that passes the high-frequency component of the output current from the current detecting means;

an arcing ground fault current-detecting means which produces a signal indicating an arcing ground fault when the output current from the first filter exceeds a predetermined value;

a second filter that passes those frequencies of the output currents from the current detecting means which are the harmonic components of the power frequency;

an arcing ground fault current-detecting means which produces a signal indicating an arcing ground fault when the output current from the second filter exceeds a predetermined value;

an overcurrent-detecting means which produces a signal indicating an overcurrent when the output current from the current detecting means exceeds a predetermined value;

a ground fault current detecting means for detecting a ground fault current which flows through the distribution line and has the power frequency;

a ground fault current-detecting circuit means which produces a signal indicating a ground fault when the ground fault current detected by the ground fault current detecting means exceeds a predetermined value;

a no-voltage detecting means which senses that the distribution line is not electrically charged; and a trip mechanism which opens the device when the no-voltage detecting means produces an output after one or more of the arcing ground fault current-detecting means, the overcurrent-detecting means, and the ground fault current-detecting circuit means produces an output.

10. A device for automatically detecting a downed conductor, said device being equipped with a sectionalizer, said device comprising:

a current detecting means for detecting the electric current flowing through a single-phase branch circuit in a three-phase four-wire multi-grounded distribution line;

a first filter that passes the high-frequency component of the output current from the current detecting means;

an arcing ground fault current-detecting means which produces a signal indicating an arcing ground fault when the output current from the first filter exceeds a predetermined value;

a second filter that passes those frequencies of the output currents from the current detecting means which are the harmonic components of the power frequency;

an arcing ground fault current-detecting means which produces a signal indicating an arcing ground fault when the output current from the second filter exceeds a predetermined value;

an overcurrent-detecting means which produces a signal indicating an overcurrent when the output current from the current detecting means exceeds a predetermined value;

a no-voltage detecting means which senses that the distribution line is not electrically charged; and a trip mechanism which opens the device when the no-voltage detecting means produces an output after one or more of the arcing ground fault-detecting means and the overcurrent-detecting means produces an output.

11. A device for automatically detecting a downed conductor, said device being equipped with an automatic recloser, said device comprising:

a current detecting means for detecting the electric current flowing through a three-phase four-wire multi-grounded distribution line;

a first filter that passes the high-frequency component of the output current from the current detecting means;

an arcing ground fault current-detecting means which produces a signal indicating an arcing ground fault when the output current from the first filter exceeds a predetermined value;

a second filter that passes those frequencies of the output currents from the current detecting means which are the harmonic components of the power frequency;

an arcing ground fault current-detecting means which produces a signal indicating an arcing ground fault when the output current from the second filter exceeds a predetermined value;

an overcurrent-detecting means which produces a signal indicating an overcurrent when the output current from the current detecting means exceeds a predetermined current value;

a ground fault current-detecting means which produces a signal indicating a ground fault when the ground fault current detected by the current detecting means exceeds a predetermined current value; and a trip mechanism which opens the device when one or more of the detecting means produces an output signal.

12. A device for automatically detecting a downed conductor, said device being equipped with a sectionalizer, said device comprising:

a current detecting means for detecting the electric current flowing through a three-phase four-wire multi-grounded distribution line;

a current detecting means for detecting the electric current flowing through a three-phase four-wire multi-grounded distribution line;

a first filter that passes the high-frequency component of the output current from the current detecting means;

an arcing ground fault current-detecting means which produces a signal indicating an arcing ground fault when the output current from the first filter exceeds a predetermined value;

a second filter that passes those frequencies of the output currents from the current detecting means which are the harmonic components of the power frequency;

an arcing ground fault current-detecting means which produces a signal indicating an arcing ground fault when the output current from the second filter exceeds a predetermined value;

an overcurrent-detecting means which produces a signal indicating an overcurrent when the output current from the current detecting means exceeds a predetermined value;

a ground fault current-detecting means which produces a signal indicating a ground fault when the ground fault current detected by the current detecting means exceeds a predetermined value;

a no-voltage detecting means which senses that the distribution line is not electrically charged; and a trip mechanism which opens the device when the no-voltage detecting means produces an output after one or more of the arcing ground fault current-detecting means, the overcurrent-detecting means and the ground fault current-detecting means produces an output.

* * * * *